United States Patent Office 3,256,354
Patented June 14, 1966

---

3,256,354
PROCESS FOR PREPARING DIHYDRONAPHTHA-
LENES FROM TETRAHYDRONAPHTHALENES
Allan S. Hay, Schenectady, N.Y., assignor to General
Electric Company, a corporation of New York
No Drawing. Filed Feb. 14, 1963, Ser. No. 258,616
10 Claims. (Cl. 260—668)

This invention relates to the oxidation of 1,2,3,4-tetrahydronaphthalene including the methyl and dimethyl-substituted 1,2,3,4-tetrahydronaphthalenes to the corresponding $\alpha,\beta$-dihydronaphthalenes. More particularly, this invention relates to the process of preparing $\alpha,\beta$-dihydronaphthalenes which comprises reacting oxygen with a 1,2,3,4-tetrahydronaphthalene selected from the group consisting of 1,2,3,4-tetrahydronaphthalene and a 1,2,3,4-tetrahydronaphthalene having from one to two methyl groups as the sole substituents in a homogeneous liquid phase containing no more than 5% by weight water and having dissolved therein a catalyst consisting essentially of a cobalt bromide carboxylate.

Ordinarily, when oxygen is reacted with 1,2,3,4-tetrahydronaphthalene, a peroxide is formed which then decomposes at the elevated temperature required for the oxidation reaction to occur, into a mixture of $\alpha$-tetralone and tetrahydronaphthol. As disclosed and claimed in my copending application Serial No. 258,615, filed concurrently herewith and assigned to the same assignee as the present invention, I have found that 1,2,3,4-tetrahydronaphthalene and certain methyl-1,2,3,4-tetrahydronaphthalenes can be oxidized in the presence of cobalt bromide carboxylate catalysts to give the $\alpha$-tetralone as the chief product. The reaction of oxygen with the 1,2,3,4-tetrahydronaphthalenes in the presence of this catalyst is so vigorous that the reaction is exothermic and may be initiated at room temperature.

I have now found that if I react certain 1,2,3,4-tetrahydronaphthalenes with oxygen in the presence of a cobalt bromide carboxylate catalyst and carry the reaction out at ambient atmospheric temperature and pressure conditions and moderate the flow of oxygen so that there is substantially no detectable heating of the reaction mixture, surprisingly the main product is a 1,2-dihydronaphthalene, instead of the $\alpha$-tetralone.

Although I do not wish to be bound by my theory, it appears that when the oxidation of the 1,2,3,4-tetrahydronaphthalene is carried out in the presence of my catalyst, the oxygen preferentially first reacts with the 1,2,3,4-tetrahydronaphthalene to form an unstable intermediate. If there is no deficiency of oxygen, the oxygen then reacts with the intermediate to form the $\alpha$-tetralone as the chief product. If there is a deficiency of oxygen, the activated intermediate cannot be oxidized to the $\alpha$-tetralone and a dehydrogenation reaction occurs with the formation of the corresponding 1,2-dihydronaphthalene. If sufficient oxygen is present, the reaction is extremely exothermic and even if initiated at room temperature the reaction mixture generates enough heat that there is a noticeable rise in temperature of the reaction mixture. If there is a deficiency of oxygen, the reaction of the oxygen with the 1,2,3,4-tetrahydronaphthalene produces so little heat, if any, that there is substantially no detectable heating of the reaction mixture. The above reaction may be represented by the following equations:

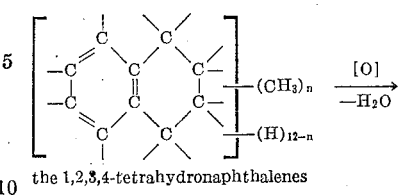

the 1,2,3,4-tetrahydronaphthalenes

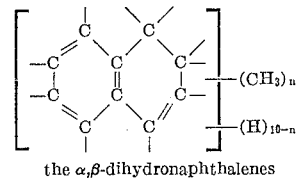

the $\alpha,\beta$-dihydronaphthalenes where $n$ is one of the integers 0, 1, 2.

Using 1,2,3,4-tetrahydronaphthalene as an example the following shows the nomenclature system used to designate the carbon atoms of the 1,2,3,4-tetrahydronaphthalenes and dihydronaphthalenes of this invention:

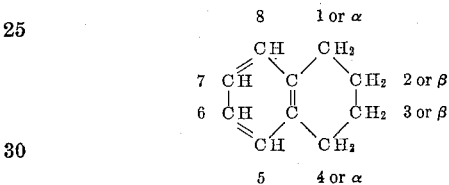

The catalyst for this reaction is so unique and specific that the omission or substitution of one component renders the catalyst substantially inactive. Thus, the omission of bromide or the complete substitution of other closely related components such as copper, iron, etc., for cobalt, and iodine or chlorine for bromine, etc., renders the catalyst inactive.

In carrying out the process of the present invention, the 1,2,3,4-tetrahydronaphthalene, methyl-1,2,3,4-tetrahydronaphthalene, or dimethyl-1,2,3,4-tetrahydronaphthalene (generally referred to herein as the 1,2,3,4-tetrahydronaphthalenes) are liquids and therefore may be used alone but desirably they are dissolved in a suitable solvent. The catalyst consisting essentially of a cobalt bromide carboxylate is dissolved in the liquid phase. If a solvent is used, it may be the same compound which is a product of the oxidation reaction or it may be a carboxylic acid such as the lower alkyl carboxylic acids, for example, acetic acid, propionic acid, anhydrides of such acids, etc. Oxygen is passed into the liquid phase in a suitable reaction vessel, preferably maintained at ambient atmospheric temperature and pressure, although lower temperatures and pressures may be used if desired. The flow of oxygen is moderated, preferably so that the temperature of the reaction mixture stays constant at the initial temperature and at most does not increase more than 1° C. The moderated flow of oxygen is continued until the desired amount of the 1,2,3,4-tetrahydronaphthalene is oxidized. By monitoring both the incoming and outgoing gas streams for the amount of oxygen, it can readily be determined when no more oxygen is being absorbed and the reaction is complete.

After the reaction is completed, e.g., no more oxygen is absorbed, or the desired degree of reaction has occurred, the α,β-dihydronaphthalene product is separated from the reaction mixture by conventional methods. The process can also be carried out in a continuous manner by continuously adding both the 1,2,3,4-tetrahydronaphthalene and oxygen to a solution of the cobalt bromide carboxylate in a suitable solvent. Alternatively, a part of the catalyst can be present in one part of the system while the other part of the catalyst is added with a reactant. Thus, a cobalt carboxylate can be present in the solvent and the bromine constituent added with the 1,2,3,4-tetrahydronaphthalene. By reusing the mother liquid of a prior run in a subsequent run, one can continuously reuse the catalyst.

The term "1,2,3,4-tetrahydronaphthalene having one methyl group as its sole substituent" refers to 1,2,3,4-tetrahydronaphthalene in which any one of the ring hydrogens of either the saturated or unsaturated ring of the 1,2,3,4-tetrahydronaphthalene is substituted with a methyl group. The term "1,2,3,4-tetrahydronaphthalene having two methyl groups as its sole substituents" is used to designate 1,2,3,4-tetrahydronaphthalene in which any two hydrogens on either the saturated or unsaturated ring of the 1,2,3,4-tetrahydronaphthalene are substituted by two methly groups. Typical examples of the methyl-1,2,3,4-tetrahydronaphthalenes and dimethyl-1,2,3,4-tetrahydronaphthalenes are, 1-methyl-1,2,3,4-tetrahydronaphthalene,
2-methyl-1,2,3,4-tetrahydronaphthalene,
5-methyl-1,2,3,4-tetrahydronaphthalene,
6-methyl-1,2,3,4-tetrahydronaphthalene,
1,1-dimethyl-1,2,3,4-tetrahydronaphthalene,
1,2-dimethyl-1,2,3,4-tetrahydronaphthalene
1,3-dimethyl-1,2,3,4-tetrahydronaphthalene
1,4-dimethyl-1,2,3,4-tetrahydronaphthalene,
1,5-dimethyl-1,2,3,4-tetrahydronaphthalene,
2,5-dimethyl-1,2,3,4-tetrahydronaphthalene,
1,8-dimethyl-1,2,3,4-tetrahydronaphthalene,
2,3-dimethyl-1,2,3,4-tetrahydronaphthalene,
5,6-dimethyl-1,2,3,4-tetrahydronaphthalene,
5,7-dimethyl-1,2,3,4-tetrahydronaphthalene,
5,8-dimethyl-1,2,3,4-tetrahydronaphthalene, etc.

As a general rule, oxygen attacks the hydrogen-carbon bond of the saturated α-carbon atom adjacent to the aryl nucleus of the 1,2,3,4-tetrahydronaphthalene to form the unstable intermediate which then dehydrogenates with a loss of hydrogen from both the adjacent α- and β-carbon atoms with respect to the aryl nucleus with the formation of water as a by-product under the conditions of reaction where oxygen is present in an amount insufficient to cause oxidation to the α-tetralone. As will be readily apparent, both the 1- and 4-carbon atoms are alpha to the aryl nucleus in 1,2,3,4-tetrahydronaphthalene.

In the case of 1,2,3,4-tetrahydronaphthalene itself, whether it is the 1- or 4-carbon atom which is initially attacked, is immaterial since the dehydrogenated product would still be the same α,β-dihydronaphthalene, i.e., 1,2-dihydronaphthalene. In the case of the methyl-1,2,3,4-tetrahydronaphthalenes and dimethyl-1,2,3,4-tetrahydronaphthalenes, the products will still be α,β-dihydronaphthalenes, but the products will be a mixture of the two possible α,β-dihydronaphthalenes with the proportions of the two possible isomers being dependent on the influence of the methyl substituent.

It is to be recognized that the compound which might be named 4-methyl-1,2,3,4-tetrahydronaphthalene is actually 1-methyl-1,2,3,4-tetrahydronaphthalene, according to the present rules of nomenclature. Likewise, 3-methyl-1,2,3,4-tetrahydronaphthalene is actually 2-methyl-1,2,3,4-tetrahydronaphthalene, 8-methyl - 1,2,3,4 - tetrahydronaphthalene is actually 5-methyl-1,2,3,4-tetrahydronaphthalene, 2,4 - dimethyl - 1,2,3,4 - tetrahydronaphthalene is actually 1,3-dimethyl-1,2,3,4-tetrahydronaphthalene, etc. Since both the aryl nucleus and the methyl group activate the α-carbon atom which will be attacked in the oxidation reaction, the α-carbon atom which is nearest to both the aryl nucleus and the methyl group will be preferentially attacked, except for 6-methyl-1,2,3,4-tetrahydronaphthalene, in which case it is the 1,2- positions which are preferentially dehydrogenated to produce 7-methyl-1,2-dihydronaphthalene. For example, the oxidation of 1-methyl-1,2,3,4-tetrahydronaphthalene in my reaction will produce 1-methyl-3,4-dihydronaphthalene as the main product mixed with a minor amount of 1-methyl-1,2-dihydronaphthalene. Both of these products can be described as α,β-dihydronaphthalenes. In the case of the dimethyl-1,2,3,4-tetrahydronaphthalenes in which the two methyl groups are on the same carbon atom, it is of course apparent that there is no hydrogen on this carbon atom which can enter into the dehydrogenation reaction and therefore the dehydrogenation in this case will occur between the pair of α- and β- carbon atoms which do not have the two methyl substituents. For example, 2,2-dimethyl-1,2,3,4-tetrahydronaphthalene will be dehydrogenated by my process to yield 2,2-dimethyl-1,2-dihydronaphthalene.

Since the dihydronaphthalenes produced by my process are useful for making polymers and copolymers with other ethylenically unsaturated materials, it is not necessary in those cases where a mixture of two dihydronaphthalenes are produced to separate the two isomers prior to use, since both isomers will form polymers and copolymers under polymerizable conditions. However, the two isomers may be separated, if desired, by conventional means.

The cobalt bromide carboxylate catalyst is a unique catalyst for my reaction. All of these components are essential to produce an active catalyst. Neither cobalt bromide nor a cobalt carboxylate is an effective catalyst by itself. The combination is so unique that the substitution of other elements for one or more components either totally stops or substantially impedes the reaction. Thus, little catalytic action is obtained when appreciable amounts of other substances which usually make excellent oxidation catalysts are present during the reaction. For example, the presence of appreciable amounts of dissolved cationic compounds of iron, copper, etc., in the reaction mixture substantially stops the reaction. Similarly, the presence of appreciable amounts of anions, such as sulfate, nitrate, chlorate, etc., ions inhibits the activity of this unique catalyst. These substances interfere with the reaction only when present in ionic form and then because they react with the catalyst to form cobalt compounds which are not catalytically reactive. Therefore, the only completely inactivate the catalyst when they are present in amounts which are chemically equivalent to the amount of cobalt present as the catalyst. Compounds which contain such groups as substituents which do not produce these groups in ionic form during the reaction will not interfere with the reaction and, if they do not produce such ions in sufficient quantity to completely inactivate the catalyst, they will retard but not stop the reaction. Because of this, I prefer to use a reaction mixture including the catalyst system which is essentially free of any components which impede the reaction. The substitution of other halogens such as chlorine for bromine imparts to the catalyst no appreciably greater catalytic activity than is found in the cobalt acetate alone. The presence of iodine in elemental or ionic form completely inactivates the catalyst, but may be present in compounds, for example, as a nuclear substituent on aryl compounds which do not release iodine in elemental or ionic form during the reaction. Since the normal reactants do not contain such interfering materials, it is easy to exclude them from the reaction mixture.

The atomic ratio of cobalt to bromine is important for maximum reaction rates. The most active form of catalyst is that where the cobalt bromide carboxylate is present in a form where there is one cobalt ion, one bromine ion and at least one carboxylate ion. Excess of carboxylate ions, for example, in the form of an additional carboxylic acid, has no effect whatsoever on the catalyst activity, but this is not true of the ratio between the cobalt and bromine ions. Optimum reaction rates are obtained when the cobalt and bromine are present in substantially equal atomic amounts (i.e., 0.9–1.1 atoms of bromine per atom of cobalt). A ratio of one atom of bromine per atom of cobalt represents a catalyst having a maximum reactivity. Such a ratio may be obtained by either mixing 1 mole of cobalt bromide with 1 mole of a cobalt carboxylate or by adding 1 mole of bromine or bromine engendering agent to 1 mole of a cobalt carboxylate. It is believed that the bromine supplied either from bromine itself or from the bromine engendering agent, e.g., hydrogen bromide or a bromocarboxylic acid, etc., reacts with the cobalt carboxylate to form a cobalt bromide carboxylate. Likewise, the mixture of cobalt bromide and cobalt carboxylate equilibrates and reacts as though it were a cobalt bromide carboxylate.

It is thus readliy seen that a ratio greater than 1 atom of bromide per atom of cobalt obtained by adding greater than 1 mole of the bromine containing compound in effect decreases the concentration of the active species of the catalyst and therefore decreases the reaction rate in the same way as would be obtained if less cobalt bromide carboxylate had been added initially. The effect of adding sufficient bromine to give a ratio of 2 atoms of bromine per atom of cobalt would be the same as adding cobalt bromide itself to the reaction mixture and such a material is completely inactive as a catalyst for my reaction. Likewise, if insufficient bromine compound is added, to supply an atomic ratio of 1 atom of bromine per atom of cobalt, the catalyst concentration is again decreased with the same effect on the reaction rate, since the excess cobalt carboxylate not converted to the cobalt bromide carboxylate has no catalytic effect.

The rate of reaction decreases rapidly as the bromine-to-cobalt atomic ratio is increased and conversely, as the bromine-to-cobalt atomic ratio is decreased from unity, there is a decrease in activity, although this decrease is less marked. I have found that a bromine-to-cobalt atomic ratio of 2, i.e., 2 atoms of bromine per atom of cobalt, substantially stops the reaction and that the reaction proceeds at a slow rate even at as low a ratio as 0.08. Although in practice I prefer to use ratios of about 0.3–1 atom of bromine per atom of cobalt, ratios of 0.1–1.2 atoms of bromine per atom of cobalt give satisfactory results. However, ratios in the range of 0.08–1.9 atoms of bromine per atom of cobalt can be used. Although an initial bromine-to-cobalt atomic ratio of 2 substantially stops the reaction, bromine losses may occur during the reaction or during a continuous or multicycle reaction wherein the mother liquid is continuously reused, thus permitting the addition of more bromine if desired. However, the catalytically effective bromine-to-cobalt ratios should not be greater than 1.9 and preferably not greater than 1.2.

As stated previously, the molar ratios of the carboxylic acid to cobalt have no upper limit, with the results that carboxylic acids can be employed as solvents for the reaction. The carboxylate ion constituent of the catalyst is generally furnished as the carboxylate salt of cobalt, but may be formed in situ by the reaction of a cobalt salt with a carboxylic acid, carboxylic anhydride, etc. To produce some of the carboxylate ion and all of the bromine ion of the catalyst, an acid bromide may be used.

The cobalt constituent of the catalyst is furnished by cobalt compounds in the divalent or trivalent state. Most simple cobalt salts can be isolated as stable solids only in the form of divalent salts, but trivalent cobalt salts such as cobaltic acetate, cobaltic hydroxide, cobaltic carbonate, are known. The latter two compounds and the corresponding cobaltous hydroxide and carbonate as well as the oxides of cobalt are a convenient source of cobalt for the catalyst when it is desired to form the catalyst by reaction with a carboxylic acid which is to be used as the solvent. Specific divalent cobalt compounds include cobalt bromide and cobalt salts of carboxylic acids which may be the same or different carboxylic acid used as the solvent. Where the reaction is carried out in the presence of a large amount of a carboxylic acid, for example, acetic acid, cobalt, regardless of its initial form, generally takes the form of the salt of the carboxylic acid used as solvent in the reaction mixture, e.g., the acetate when acetic acid is the solvent. Therefore, any cobalt salt of the type described which is soluble in the solvent employed in an amount sufficient to form a catalyst and does not introduce interfering ions is satisfatcory for the process. Because of its availability, the preferred source of cobalt is cobaltous acetate tetrahydrate which may be used in conjunction with cobalt bromide. However, other suitable cobalt catalysts include the cobaltous salts of other aliphatic acids as, for example, cobaltous propionate, cobaltous butyrate, cobaltous 2-chlorobutyrate, cobaltous hydroxystearate, cobaltous succinate, the monocobalt salt of succinic acid, the cobalt salt of the monoethyl ester of succinic acid, cobaltous levulinate, cobaltous tartrate, cobaltous ethoxybutyrate, etc. In addition, cobaltous salts of aromatic carboxylic acids may also be employed as catalysts. Thus, I can employ salts such as cobaltous benzoate, cobaltous (ethylthio)benzoate, cobaltous (methylsulfinyl)benzoate, cobaltous (phenylsulfonyl)-benzoate, cobaltous fluorobenzoate, cobaltous chlorobenzoate, cobaltous bromobenzoate, cobaltous iodobenzoate, cobaltous toluate, cobaltous terephthalate, the monocobalt salt of isophthalic acid, the cobalt salt of the monoethyl ester of o-phthalic acid, cobaltous naphthalenecarboxylate, etc. Inorganic cobalt salts of anions that inactivate the catalyst should be avoided, for example, cobalt salts containing sulfate, nitrate, iodide, iodate, chlorate, etc., ions.

The bromine constituent of the catalyst is generally furnished by bromine compounds containing bromine capable of being readily removed from the parent compound, i.e., compounds containing a labile bromine atom. Such compounds are precursors of bromine or hydrogen bromide, which is formed during the oxidation reaction to supply the bromine constituent of the catalyst. Specific compounds include the bromocarboxylic acids, for example, the bromoaliphatic acids, e.g., the bromoacetic acids, the bromopropionic acids, the bromobutyric acids, the bromosuccinic acids, etc., cycloaliphatic carboxylic acids containing removable bromine, for example α-bromocyclohexanecarboxylic acid, etc.; free bromine (i.e., $Br_2$); acid bromides, for example, acetyl bromide, etc.; bromocarbons containing bromine capable of being readily removed from the parent compound, for example, bromochloroform, etc.; hydrogen bromide, cobalt bromide, etc. I have found that one mole of HBr per mole of cobalt acetate produces an extremely active catalyst.

A wide variety of solvents may be employed in the reaction with maximum yields being obtained with inert solvents which do not adversely affect the reaction, and in which both the reactant and catalyst are soluble, for example, aromatic and aliphatic hydrocarbons, esters, etc. However, solvents which are oxidized during the reaction, e.g., the starting material, ketones, etc., may likewise be used as solvents. When the starting material is used as solvent, the product becomes the solvent during the latter part of the reaction. Because carboxylic acids make excellent solvents for both the reactant and catalyst, they are preferred solvents. Since carboxylic acids form part of the catalyst and there is no upper limit to the amount of carboxylic acid the reaction will tolerate, these solvents can be used as the source of the carboxylate ion constituent of the catalyst, as well as the solvent. For obvious reasons, it is highly desirable to use a liquid carboxylic acid, although solid carboxylic acids can be used in conjunction with other solvents under liquefying conditions. Thus, benzoic acid dissolved in benzene or in the tetralin starting material may be used as a combined solvent and source of carboxylate ion constituent for the catalyst system. Examples of other carboxylic acids comprise aliphatic carboxylic acids, for example, the acids corresponding to the carboxylate portion of the cobalt salts previously named, e.g., acetic, propionic, butyric, succinic, tartaric, levulinic, bromobutyric, etc., acids, cycloaliphatic carboxylic acids, for example, naphthenic acid, cyclohexane carboxylic acid, etc. In addition, carboxylic acid precursors such as carboxylic anhydrides, for example, acetic anhydride, etc., can also be employed. These anhydrides can serve as solvents or in conjunction with other solvents and additionally serve as a means for removing water formed during the reaction. Mixtures of these acids with other solvents can also be employed. For example, mixtures of acetic acid with acetophenone, etc. As a class, the lower aliphatic carboxylic acids are preferred as solvents. The specific lower carboxylic acids preferred are acetic and propionic acids.

From the above discussion it is seen that the catalyst constituents can be selected from a wide variety of starting materials. A single compound which would meet all the requirements of the catalyst would be a cobalt salt of both hydrogen bromide and a carboxylic acid, for example cobalt acetate bromide. However, these compounds are not readily available and offer no advantage over a binary mixture of equimolar amounts of a cobalt salt of a carboxylic acid, for example, cobalt acetate, etc., and a bromine compound, for example, cobalt bromide, hydrogen bromide, bromine, etc. All of these would give a ratio of one atom of bromine to one atom of cobalt, i.e., a bromine-to-cobalt ratio of 1, but by varying the proportions in the binary mixture any desired ratio may be obtained. Ternary mixtures may be used to form the catalyst. For example, cobalt oxides, hydroxides, or carbonates and a bromine compound, for example, hydrogen bromide, bromine, cobalt bromide, etc., may be dissolved in a carboxylic acid to produce the same catalyst.

As has been pointed out previously, the rate of the oxygen addition to the reaction is critical and must be moderated so that there is substantially no heating of the reaction mixture due to the oxidation reaction. It should be understood that in addition to employing free oxygen as the oxidizing agent in my process, it is also possible and generally desirable to employ an oxygen-containing gas in which the ingredient other than oxygen is inert under the conditions of the reaction; for example, oxygen mixed with such inert gases as helium, neon, xenon, krypton, argon, etc., as diluents with the oxygen in the feed gas. However, the most convenient source of dilute oxygen is air itself. Since air allows a larger volume of gas to be introduced into the reaction mixture in a given time than could be introduced as pure oxygen, it is easier to control and moderate the amount of oxygen being introduced into the reaction mixture. Furthermore, the dilution of the oxygen by the nitrogen in the air further tends to help starve the reaction mixture of oxygen, thereby aiding reaction in obtaining the desired $\alpha,\beta$-dihydronaphthalenes. Since the use of pressure other than atmospheric pressure has no beneficial effect on the reaction, I prefer to use atmospheric pressure. However, higher or lower pressures than atmospheric pressure may be used.

The temperature of the reaction should be no more than the ambient atmospheric temperature but may be less if desired. However, the effect of cooling is merely to slow the reaction still further and since this is no advantage in the process, I prefer to use the ambient atmospheric temperature for carrying out my reaction.

In the oxidation of the 1,2,3,4-tetrahydronaphthalenes to $\alpha,\beta$-dihydronaphthalenes, one of the products of reaction is water. In carrying out the reaction, it is found that the presence of a large amount of water has an adverse effect on the rate of reaction. Thus, when an amount of water in excess of about 0.05 part by weight per part of solvent is allowed to accumulate, the reaction is substantially stopped. Therefore, I prefer to carry out the reaction under nearly anhydrous conditions and with a maximum of about 0.05 part water per part of solvent (5% by weight). Minute traces of water are often desirable since these help solubilize the cobalt constituent of the catalyst. Thus, cobalt acetate tetrahydrate is very soluble in acetic acid while anhydrous cobalt acetate is only slightly soluble. However, anhydrous cobalt acetate is quite soluble in acetic acid when hydrogen bromide is present. The removal of water during the reaction is readily accomplished by the use of desiccants, by the use of carboxylic acid anhydrides, or by using a higher ratio of solvent to the amount of the 1,2,3,4-tetrahydronaphthalene being oxidized. Sweeping of the reaction mixture with a dry inert gas either as a separate stream or as a diluent with the oxygen likewise helps to sweep water from the reaction mixture.

The catalyst will be effective in the oxidation of the 1,2,3,4-tetrahydronaphthalene regardless of the amount present in the reaction mixture at any given time. The actual oxidation of the 1,2,3,4-tetrahydronaphthalene is extremely rapid and therefore since the amount of oxygen being admitted is purposely controlled to starve the reaction, the rate at which the oxygen is admitted is the rate controlling factor and this need only be limited so that essentially no detectable heating of the reaction mixture occurs. Should the reaction mixture start to heat, the flow of oxygen should be reduced to eliminate the heating of the reaction mixture. The only noticeable effect of allowing the mixture to become self-heating would be that during this time some $\alpha$-tetralone will be formed which will decrease the amount of $\alpha,\beta$-dihydronaphthalene obtained.

The following examples are illustrative of the practice of my invention, and are not intended for purposes of limitation. In the examples, all parts are by weight unless otherwise stated.

*Example 1*

Air was slowly passed in through a solution of 10 grams of cobalt acetate tetrahydrate, 10.8 grams of 30% hydrogen bromide in acetic acid and 66 grams of 1,2,3,4-tetrahydronaphthalene dissolved in 250 ml. of propionic acid at room temperature. The rate that air was bubbled through the solution was so moderated that the reaction mixtures stayed at room temperature during the entire 16 hours that the air was bubbled through the reaction mixture. At the end of this time, the reaction was mixed with a large volume of water and extracted with ether. The ether layer was washed with sodium bicarbonate solution, and dried over anhydrous magnesium sulfate and filtered. After removal of the ether layer, there was obtained a light orange oil which was analyzed and found to contain 67.2% of unchanged 1,2,3,4-tetrahydronaphthalene, 20.7% 1,2-dihydronaphthalene, 4.7% naphthalene, and 4.8% $\alpha$-tetralone. The 1,2-dihydronaphthalene was analyzed and found to contain 91.9% carbon, 7.5% hydrogen compared to a theoretical value of 92.26% carbon and 7.74% hydrogen. The index of refraction was found to be 1.5829 compared to a reported value for 1,2-dihydronaphthalene of 1.583. Although the reaction can be continued for a longer period of time to convert more of the 1,2,3,4-tetrahydronaphthalene to dihydronaphthalene, I have found that longer reaction times also convert some of the desired 1,2-dihydronaphthalene into naphthalene itself which is an undesired by-product of this reaction. It is therefore better to stop the reaction at moderate conversion to the dihydronaphthalene and then isolate this from the reaction mixture and recharge the recovered 1,2,3,4-tetrahydronaphthalene to the reactor.

*Example 2*

By repeating Example 1 but using 1-methyl-1,2,3,4-tetrahydronaphthalene in place of the 1,2,3,4-tetrahydronaphthalene, the α,β-dihydronaphthalene obtained is a mixture of both 1-methyl-1,2-dihydronaphthalene and 1-methyl-3,4-dihydronaphthalene with the former being the predominant isomer in the product.

*Example 3*

By repeating Example 1 but using 6-methyl-1,2,3,4-tetrahydronaphthalene in place of 1,2,3,4-tetrahydronaphthalene, the α,β-dihydronaphthalene product is a mixture of 6-methyl-1,2-dihydronaphthalene and 6-methyl-3,4-dihydronaphthalene.

*Example 4*

By repeating Example 1 but using 2,6-dimethyl-1,2,3,4-tetrahydronaphthalene in place of the 1,2,3,4-tetrahydronaphthalene, the α,β-dihydronaphthalene produced is a mixture of both the 2,6-dimethyl-1,2-dihydronaphthalene and 2,6-dimethyl-3,4-dihydronaphthalene.

Although the foregoing examples have described a number of variations and modifications which may be employed in the practice of the present invention, it should be understood that my invention is also applicable to reactants, reactant conditions and proportions of ingredients taught in the specification, but not specifically illustrated by the examples.

The α,β-dihydronaphthalenes prepared by the method of this invention exhibit the same utility as the same compounds prepared by any other method. Thus, the α,β-dihydronaphthalenes may be polymerized alone or copolymerized with other ethylenically unsaturated compounds for example, olefins having from one to eight carbon atoms in the presence of a Friedel-Crafts catalyst to produce polymers and copolymers useful as additives in lubricating oils.

From the foregoing, it is evident that a facile, unique and original oxidation process has been described. The foregoing detailed description has been given for clearness of understanding only, and no unnecessary limitations are to be understood therefrom. The invention is not limited to the exact details shown and described, since obvious modifications will occur to those skilled in the art. It is therefore to be understood that changes may be made in the particular embodiments of the invention described which are within the full intended scope of the invention as defined by the appended claims.

What I claim as new and desire to secure by Letters Patent of the United States is:

1. The process of making an α,β-dihydronaphthalene which comprises reacting oxygen with a 1,2,3,4-tetrahydronaphthalene selected from the group consisting of 1,2,3,4-tetrahydronaphthalene and 1,2,3,4-tetrahydronaphthalenes having from one to two methyl groups as the sole substituents, in a homogeneous liquid phase containing no more than 5% by weight water, and having dissolved therein a catalyst consisting essentially of a cobalt bromide carboxylate, the ratio of bromine and cobalt present in the liquid phase being in the range of 0.008 to 1.9 atoms of bromine per atom of cobalt, said reaction being carried out at essentially no greater than ambient atmospheric temperature and pressure conditions, and the flow of oxygen being so moderated that there is substantially no detectable self-heating of the reaction mixture.

2. The process of claim 1 in which a lower aliphatic carboxylic acid is employed as a solvent.

3. The process of making an α,β-dihydronaphthalene which comprises reacting oxygen with a 1,2,3,4-tetrahydronaphthalene selected from the group consisting of 1,2,3,4-tetrahydronaphthalene and 1,2,3,4-tetrahydronaphthalenes having from one to two methyl groups as the sole substituents, in a homogeneous liquid phase containing no more than 5% by weight water, and having dissolved therein a catalyst consisting essentially of a cobalt bromide carboxylate, the ratio of bromine and cobalt present in the liquid phase being in the range of 0.1 to 1.2 atoms of bromine per atom of cobalt, said reaction being carried out at essentially no greater than ambient atmospheric temperature and pressure conditions, and the flow of oxygen being so moderated that there is substantially no detectable self-heating of the reaction mixture.

4. The process of claim 3 wherein the compound oxidized is 1,2,3,4-tetrahydronaphthalene.

5. The process of claim 3 in which the compound oxidized is 1,2,3,4-tetrahydronaphthalene having one methyl group as its sole substituent.

6. The process of claim 3 in which the compound oxidized is 1,2,3,4-tetrahydronaphthalene having two methyl groups as its sole substituents.

7. The process of producing an α,β-dihydronaphthalene which comprises reacting oxygen with a 1,2,3,4-tetrahydronaphthalene selected from the group consisting of 1,2,3,4-tetrahydronaphthalene and 1,2,3,4-tetrahydronaphthalene having from one to two methyl groups as the sole substituents, in a homogeneous liquid phase containing no more than 5% by weight water, and having dissolved therein a catalyst consisting essentially of a cobalt acetate bromide, the ratio of the bromine and cobalt present in the liquid phase being in the range of 0.1 to 1.2 atoms of bromine per atom of cobalt, said reaction being carried out at essentially no greater than ambient atmospheric temperature and pressure conditions, and the flow of oxygen being so moderated that there is substantially no detectable self-heating of the reaction mixture.

8. The process of claim 7 wherein the compound oxidized is 1,2,3,4-tetrahydronaphthalene.

9. The process of claim 7 wherein the compound oxidized is 1,2,3,4-tetrahydronaphthalene having one methyl group as its sole substituent.

10. The process of claim 7 in which the compound oxidized is 1,2,3,4-tetrahydronaphthalene having two methyl groups as its sole substituents.

References Cited by the Examiner

UNITED STATES PATENTS 2,833,832   5/1958   Fox _____ 260—668

DELBERT E. GANTZ, *Primary Examiner.*

C. R. DAVIS, *Assistant Examiner.*